United States Patent
Shemla et al.

[11] Patent Number: 5,930,261
[45] Date of Patent: Jul. 27, 1999

[54] BUS PROTOCOL

[75] Inventors: David Shemla, Kfar Havradim; Eyal Waldman, Tivon; Yosi Sholt, Haifa, all of Israel

[73] Assignee: Galileo Technologies Ltd, Karmiel, Israel

[21] Appl. No.: 08/790,151

[22] Filed: Jan. 28, 1997

[30] Foreign Application Priority Data

Jan. 31, 1996 [IL] Israel ........................................ 116988

[51] Int. Cl.⁶ .................................................. H04L 12/54
[52] U.S. Cl. ........................ 370/428; 370/410; 370/429; 395/309
[58] Field of Search ................................... 370/428, 410, 370/522, 395, 396, 381, 429; 395/309

[56] References Cited

U.S. PATENT DOCUMENTS

| | | |
|---|---|---|
| 5,412,805 | 5/1995 | Jordan et al. . |
| 5,623,644 | 4/1997 | Self ........................................ 395/558 |
| 5,632,021 | 5/1997 | Jennings et al. . |
| 5,634,138 | 5/1997 | Ananthan et al. . |
| 5,724,529 | 3/1998 | Smith et al. . |
| 5,764,996 | 6/1998 | Armstrong et al. . |

*Primary Examiner*—Jeffery A. Hofsass
*Assistant Examiner*—Clement Townsend
*Attorney, Agent, or Firm*—Darby & Darby

[57] ABSTRACT

A write-only data transfer protocol for peripheral component interface busses and a method for transferring data between source and destination communication units is provided. The method includes the source communication unit writing a buffer allocation request to the destination unit and, in response to the buffer allocation request, the destination communication unit allocating space within an associated buffer to receive the data to be sent. The method also includes the destination communication unit writing at least the location of the allocated buffer to the source communication unit and the source communication unit writing the data to be sent to the allocated buffer location.

12 Claims, 5 Drawing Sheets

BUS PROTOCOL

FIELD OF THE INVENTION

The present invention relates to data transfer protocols generally and to such protocols for implementation on a peripheral component interface (PCI) bus and within a network switch in particular.

BACKGROUND OF THE INVENTION

A network switch creates a network among a plurality of nodes (connected to personal computers, workstations, etc.) and other network switches connected thereto. As shown in FIG. 1 to which reference is now made, each node 10 is connected to one port of a switch 12. Further ports 14 also serve to connect network switches together. The switches are typically connected together via a bus 16. Optionally, a central processing unit (CPU) 15 which is associated with a main memory element 17 can also be connected to the bus 16. The CPU 15 overseas the communication operations which occur between the network switches 12. The main memory 17 temporarily stores packets of data to be transferred between switches 12.

Each node 10 sends packets of data to the network switch 12 which then routes the packets either to another of the nodes connected thereto or to a network switch to which the destination node is connected. In the latter case, the destination network switch then routes the packet to the destination node.

Each network switch also has to temporarily store the packets of data, in buffers 18, while the switch determines how, when and through which port to retransmit the packets. Each packet can be transmitted to only one destination address (a "unicast" packet) or to more than one unit (a "multicast" or "broadcast" packet). For multicast and broadcast packets, the switch typically stores the packet only once and transmits multiple copies of the packet to some (multicast) or all (broadcast) of its ports. Once the packet has been transmitted to all of its destinations, it can be removed from its buffer 18 or written over.

One example of a prior art process of transferring packets between network switches is illustrated in FIGS. 2A and 2B to which reference is additionally made. FIG. 2A is a block diagram illustration of the flow of data between the source and destination network switches and FIG. 2B is a timing diagram of the activity of the bus 16.

The source network switch 12A, on its own schedule, reads the packet from its temporary storage location, labeled 19A, and writes the packet to the main memory 17 (step 20). The source network switch 12A then provides (step 22) an indication to the CPU 15 that the transfer has finished. At some later point after the transfer has finished, the CPU 15 indicates (step 24) to the destination network switch 12B that the main memory 17 is storing its data.

When the destination network switch 12B receives the notification from the CPU 15, the destination network switch 12B begins the read process and takes control of the bus 16. The read process includes steps 26–32, as follows. In step 26, the destination network switch 12B determines where, in its temporary storage unit, there is room for the incoming packet (for example, location 19B). In step 28, destination network switch 12B asks the main memory 17 to read the packet and, when the packet is received, switch 12B places it (step 30) into the available location 19B. When the destination network switch 12B has finished the read operation, it, in step 32, sends a message to the CPU 15 that the packet was properly received. In step 34, the CPU 15 receives the receipt message and clears the location in the main memory 17 in which the data was previously stored.

FIG. 2B illustrates the timing of the packet transfer. The packet transfer begins with the "source write" (SW) operation of steps 20–22 which is generally a short operation. At some later point, the destination read (DR) operation occurs. Since the read process includes allocating the storage location and accessing the main memory 17, and since main memory 17 typically reads at a slow rate, the read operation takes a long time. Unfortunately, during the read operation, no other switch can access the bus. Thus, the rate of data transfer is limited by the speed at which the main memory 17 can read the data, even if the bus 16 and the other components can operate at faster speeds.

SUMMARY OF THE PRESENT INVENTION

Applicants have realized that, since read operations are limited by the speed of the main memory 17 (or of any other memory being read), while write operations occur at the speed of the bus 16, the utilization efficiency of the bus can be increased if data transfers are performed using only write operations.

It is therefore an object of the present invention to provide a write-only bus transfer mechanism in which no read operations occur. In the present invention, data is written directly, such as by direct memory transfer, from one network switch to the other and a packet is not sent from the source network switch until the destination network switch has allocated a storage location for the packet and has notified the source network switch of the allocated storage location. Thus, the packet can immediately be written into the destination network switch as soon as it arrives at the destination network switch. Furthermore, since the storage space is allocated for the packet before the packet is ever sent, the source network switch does not need to wait for a receive notice before beginning to send the next packet.

In one embodiment, the method includes the steps of:

a) the source communication unit writes a buffer allocation request to the destination unit;

b) in response to the buffer allocation request, the destination communication unit allocates space within an associated buffer to receive the data to be sent;

c) the destination communication unit writes at least the location of the allocated buffer to the source communication unit; and d) the source communication unit writes the data to be sent to the allocated buffer location.

Additionally, in accordance with a preferred embodiment of the present invention, the step of writing a buffer allocation request includes the step of writing at least the address of the source communication unit and the size of the data to be transferred into a buffer allocation request register of the destination communication unit. Similarly, the second step of writing includes the step of writing at least the address of the allocated buffer and of the destination communication unit into a start of packet register in the source communication unit.

Moreover, in accordance with a preferred embodiment of the present invention, the steps of writing are performed by direct memory access transfer.

Further, in accordance with a preferred embodiment of the present invention, the source and destination communication units are physically separate units.

Finally, in accordance with a preferred embodiment of the present invention, the source communication unit can write a) the data to be sent on a bus data line and b) at least the address of the destination communication unit and the address of a buffer location within the destination communication unit on a bus address line.

BRIEF DESCRIPTION OF THE DRAWINGS

The present invention will be understood and appreciated more fully from the following detailed description taken in conjunction with the drawings in which.

DETAILED DESCRIPTION OF THE PRESENT INVENTION

Figure 1:
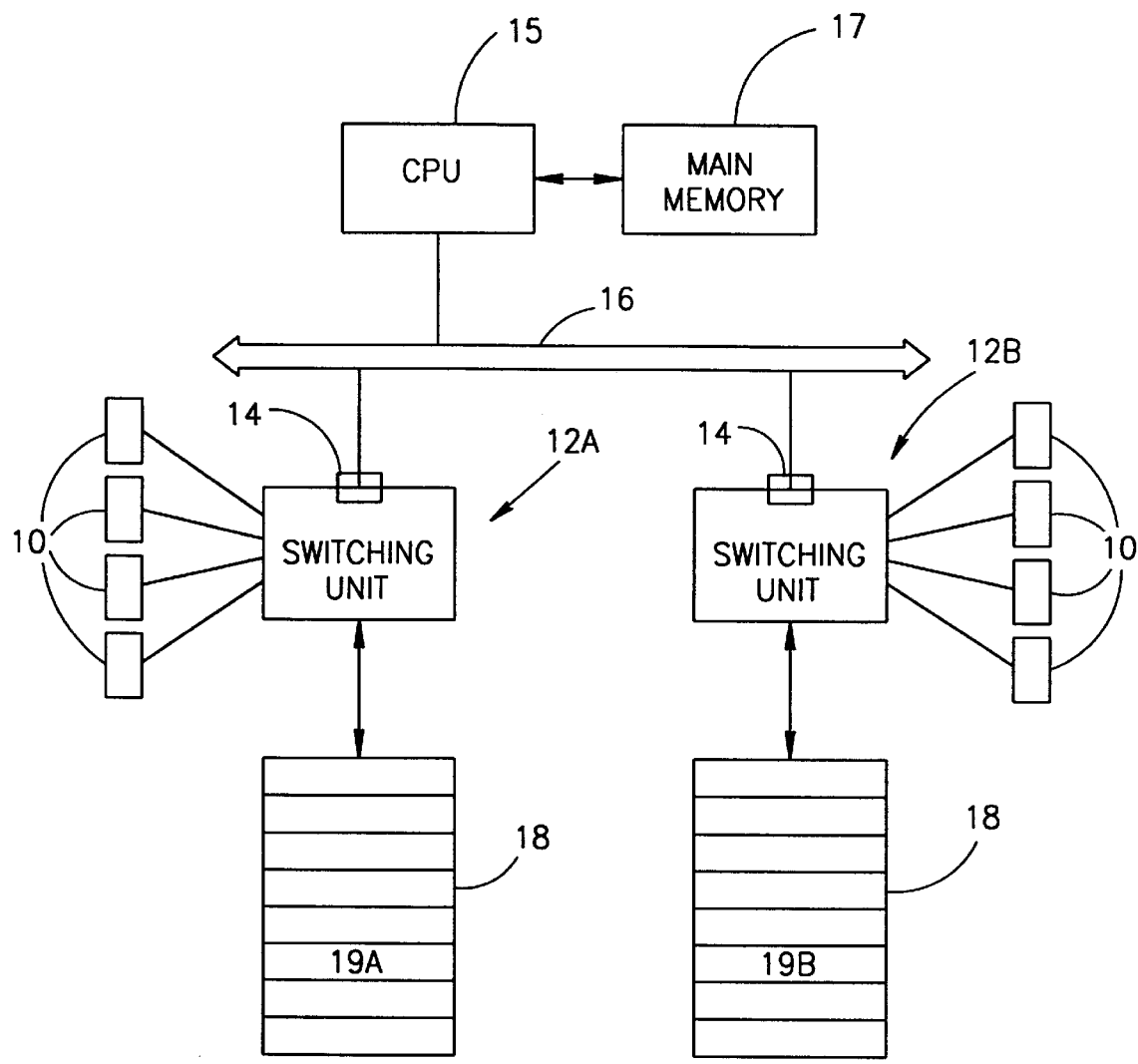
FIG. 1 is a schematic illustration of two prior art network switches connected together by a bus.
Figure 4B:
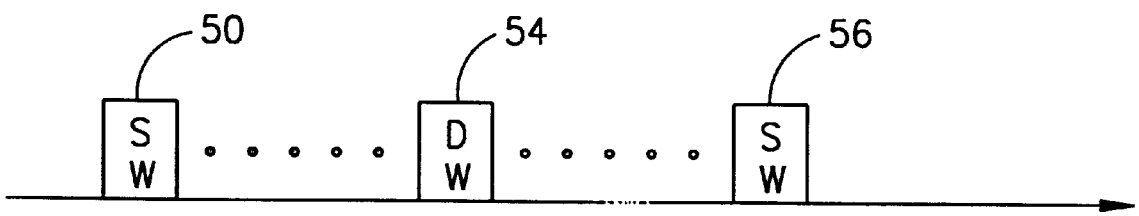
FIG. 4B is a timing diagram illustration of the activity of the bus during the operations of FIG. 4A.
Figure 3:
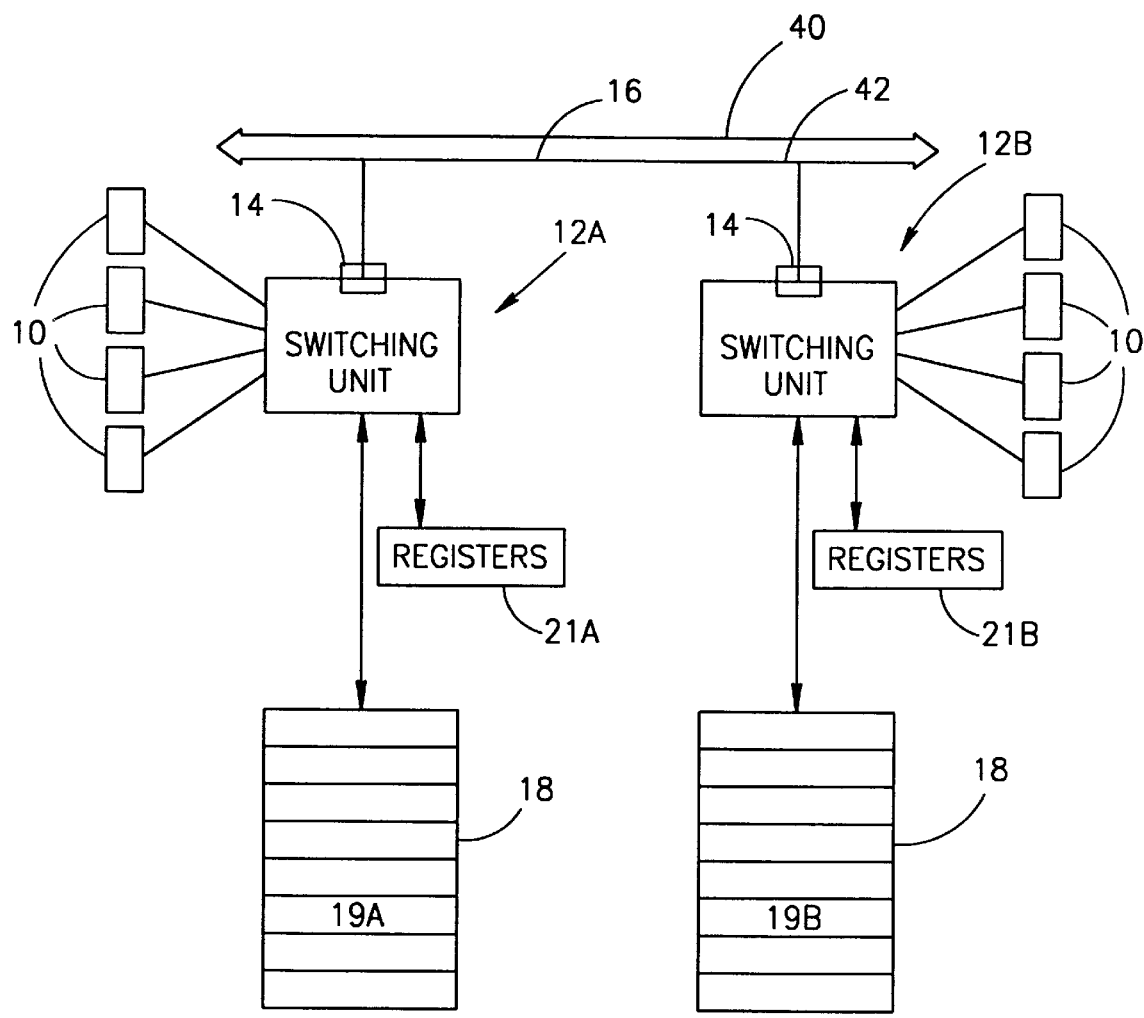
FIG. 3 is a schematic illustration of two network switches, constructed and operative in accordance with a preferred embodiment of the present invention.
Figure 4A:
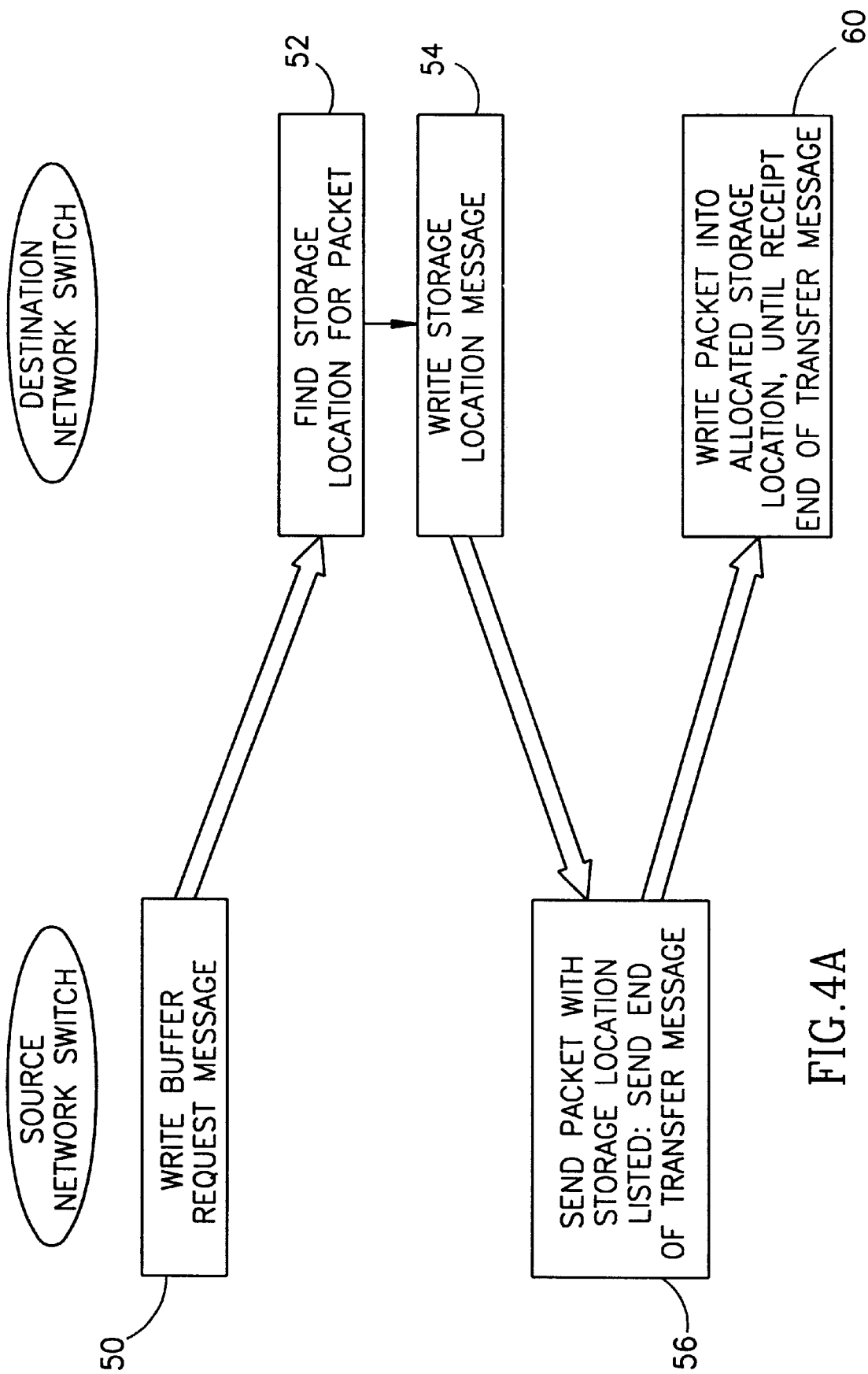
FIG. 4A is a flow chart illustration of the operations performed by the two switches of FIG. 3 during the data transfer operation of the present invention.

Reference is now made to FIG. 3 which illustrates the network configuration of the present invention and to FIGS. 4A and 4B which illustrate the data transfer operation of the present invention. Elements of FIG. 3 which are similar to those of FIG. 1 have the same reference numerals. As can be seen in FIG. 3, the present invention does not need the CPU 15 or the main memory 17 for the data transfer operation. This is because the present invention provides a "write-only" data transfer operation in which packets of data are written directly into the destination network switch 12B. It is noted that, in one embodiment, the data transfer operations utilized are direct memory access (DMA) write transfers.

The network switches of the present invention additionally have a plurality of registers 21 which are utilized during the data transfer operation. These registers can form part of the storage unit in which the buffers 18 are located or they can be separate therefrom. Furthermore, it is noted that the bus 16 has at least two lines, a data line 40 and an address line 42.

In the present invention, packets of data are not transferred until a buffer location 19 is allocated for them in the buffer 18 of the destination network switch 12B. Furthermore, since the transfer operation is a DMA transfer, a packet is directly written into the location allocated therefor.

The present discussion will consider the transfer of a single packet of data. It will be appreciated that many packets of data can be transferred in parallel by performing the operations described hereinbelow many times either in parallel or serially.

In accordance with a preferred embodiment of the present invention, when a packet of data is to be transferred, the source network switch 12A initially writes (step 50, FIG. 4A) a "buffer request" message to the register 21b of the destination network switch 12B. The buffer request message asks that the destination network switch allocate a buffer for the data to be transferred.

In the DMA transfer embodiment of the present invention, the source network switch 12A provides, on address line 42, the address of the "buffer request" register, the address of destination network switch 12B and its "return" address. Source network switch 12A provides, on data line 40, the size (or byte count) of the packet to be transferred and the buffer location 19A in which it is stored. The data of the data line is then written directly into the buffer request register.

In response to the buffer request message, the destination network switch 12B determines (step 52) the buffer location 19B in which the packet can be stored. It then writes (step 54) a "start of packet" message to the register 21a of the source network switch 12A which includes at least the location of the allocated buffer and the port numbers of the source and destination network switches. It can also include the byte count.

For example, in the DMA transfer embodiment of the present invention described hereinabove, the destination network switch 12B provides, on address line 42, the address of the "start of packet" register and the address of source network switch 12A. Destination network switch 12B provides, on data line 40, at least the following: the byte count of the packet to be transferred, the address 19B of the allocated buffer, the port number of the destination network switch 12B, and, for identification, the buffer location 19A in which the data is stored in the source network switch 12A and the port number of the source network switch 12A. As before, the data of the data line is then directly written into the start of packet register.

In response to receipt of the start of packet message in the start of packet register, the source network switch 12A writes (step 56) the packet of data to the allocated buffer location, followed by an "end of packet" message. Once the source network switch 12A has finished writing the end of packet message, it is free to send the next packet, beginning at step 50.

In the above described embodiment, the writing of the packet of data involves providing the address of the destination network switch 12B and the buffer location 19B on the address line 42 and the packet to be transferred on the data line 40. The transferred packet is then directly written into the allocated buffer location 19B. The end of packet message is written in a similar manner to the other messages. The address information includes the address of the end of packet register and the address of the destination network switch 12B. The data includes the port number of the destination network switch 12B, the buffer location 19B and the byte count.

When the packet arrives at the destination network switch 12B it directly writes (step 60) the packet into the allocated buffer location 19B, as per the address on the address line 42, until it receives the end of packet message for that allocated buffer location. The destination network switch 12B is now free to perform other operations until it receives a next buffer allocation request.

FIG. 4B illustrates the timing of the packet transfer described in FIG. 4A. The initial source write operation of the buffer request message (step 50) is typically relatively short since write operations take relatively little time and since the message to be transferred is small. Some time later, there is a destination write (DW) operation of the start of packet message (step 54). The destination write operation takes approximately the same length of time as the first source write operation. Some time later, there is a further source write operation (step 56) of the packet transfer and end of packet message. Since, for this operation, there is more data to be transferred, this source write operation is shown to take a longer time than the other two write operations.

Figure 2A:
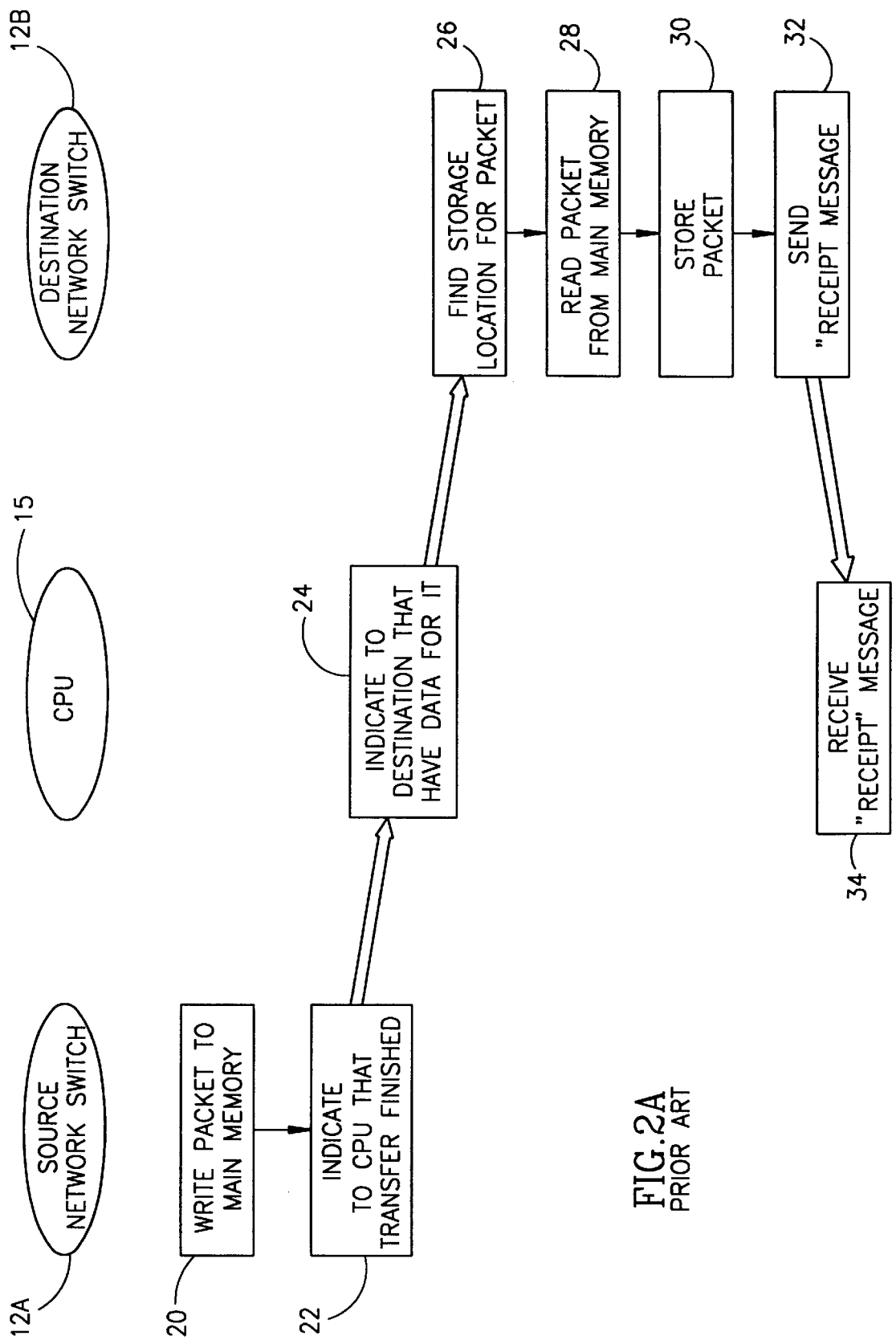
FIG. 2A is a flow chart illustration of the operations performed by the two switches of FIG. 1 during the prior art data transfer operation.
Figure 2B:
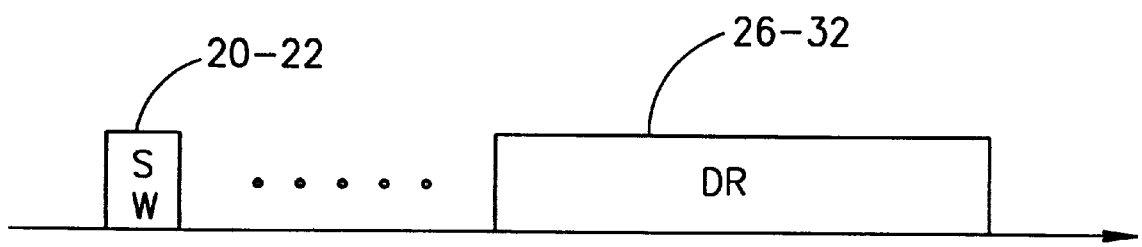
FIG. 2B is a timing diagram illustration of the activity of the bus during the operations of FIG. 2A.

A comparison of the timing of FIGS. 2B and 4B indicate that the amount of time the bus is utilized for a single transfer operation is much smaller in the present invention (FIG. 4B) than in the prior art (FIG. 2B) since the present invention utilizes write operations only.

The source and network switches are free to perform other operations after they finish their writing operations.

It is also noted that, in the present invention, the source network switch 12A is free to operate on other packets once it has finished writing its packet, and its associated end of packet message, to the bus. The source network switch 12A does not need to ensure that the destination network switch 12B has successfully received the packet since, in the present invention, the address for the data (in the destination network switch) is known and is fully allocated prior to sending the packet; the packet would not be sent if there was no buffer location available for it. In the present invention, the time it takes for the destination network switch 12B to process the packet is not relevant to the operation of the source network switch 12A.

It will be appreciated that the data transfer mechanism described hereinabove can be implemented in any type of network switch or other communication device communicating along a bus, such as transferring data to a peripheral hard disk. For example, it can be implemented in an Ethernet switch, an asynchronous transfer mode (ATM) switch or a Token Ring switch. The present invention is may be implemented for peripheral component interface (PCI) busses or for any other bus.

It will further be appreciated by persons skilled in the art that the present invention is not limited to what has been particularly shown and described hereinabove. Rather the scope of the present invention is defined by the claims which follow:

We claim:

1. A method for transferring data between source and destination communication units, the method comprising the steps of:
  a. the source communication unit writing a buffer allocation request to the destination unit;
  b. in response to the buffer allocation request, the destination communication unit allocating space within an associated buffer to receive the data to be sent;
  c. the destination communication unit writing at least the location of the allocated buffer to the source communication unit; and
  d. the source communication unit writing the data to be sent to the allocated buffer location.

2. A method according to claim 1 and wherein said step of writing a buffer allocation request includes the step of writing at least the address of said source communication unit and the size of the data to be transferred into a buffer allocation request register of said destination communication unit.

3. A method according to claim 1 and wherein said second step of writing includes the step of writing at least the address of the allocated buffer and of the destination communication unit into a start of packet register in said source communication unit.

4. A method according to claim 3 and wherein said second step of writing includes the step of writing at least the address of the allocated buffer and of the destination communication unit into a start of packet register in said source communication unit.

5. A method according to claim 1 and wherein said source and destination communication units are physically separate units.

6. A method according to claim 1 wherein said steps of writing are performed by direct memory access transfer.

7. A method for transferring data between source and destination communication units, the method comprising the steps of:
  a. the source communication unit writing the data to be sent with an indication of the buffer location into which the destination communication unit should write the data to be sent.

8. A method according to claim 7 wherein said step of writing is performed by direct memory access transfer.

9. A method for transferring data between source and destination communication units connected via a bus having a data line and an address line, the method comprising the steps of:
  a. the source communication unit writing the data to be sent on said data line and at least the address of said destination communication unit and the address of a buffer location within said destination communication unit on said address line.

10. A method according to claim 9 wherein said step of writing is performed by direct memory access transfer.

11. A write-only data transfer protocol for peripheral component interface busses for transferring data between source and destination peripheral components, the method comprising the steps of:
  a. the source peripheral component writing a buffer allocation request to the destination unit;
  b. in response to the buffer allocation request, the destination peripheral component allocating space within an associated buffer to receive the data to be sent;
  c. the destination peripheral component writing at least the location of the allocated buffer to the source peripheral component; and
  d. the source peripheral component writing the data to be sent to the allocated buffer location.

12. A method according to claim 11 wherein said steps of writing are performed by direct memory access transfer.

* * * * *